United States Patent
Gerard et al.

(10) Patent No.: US 6,442,753 B1
(45) Date of Patent: *Aug. 27, 2002

(54) APPARATUS AND METHOD FOR CHECKING DEPENDENCIES AMONG CLASSES IN AN OBJECT-ORIENTED PROGRAM

(75) Inventors: Scott Neal Gerard; Steven Lester Halter; Steven J. Munroe, all of Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/919,625

(22) Filed: Aug. 28, 1997

(51) Int. Cl.[7] .................................. G06F 9/44
(52) U.S. Cl. ....................... 717/170; 717/166
(58) Field of Search ................ 395/712, 707; 707/511; 709/305, 203, 217, 324, 220, 315, 316, 332; 713/2, 156; 717/11, 7, 108, 166, 146; 710/104

(56) References Cited

U.S. PATENT DOCUMENTS

| | | | | | |
|---|---|---|---|---|---|
| 4,558,413 A | * | 12/1985 | Schmidt et al. | ............. | 707/203 |
| 5,381,547 A | * | 1/1995 | Flug et al. | ................. | 709/331 |
| 5,404,525 A | | 4/1995 | Endicott et al. | ............ | 717/108 |
| 5,421,016 A | * | 5/1995 | Conner et al. | .............. | 717/146 |
| 5,446,899 A | * | 8/1995 | Brett | ......................... | 717/145 |
| 5,499,357 A | * | 3/1996 | Sonty et al. | ................ | 710/104 |
| 5,615,400 A | * | 3/1997 | Cowsar et al. | .............. | 709/332 |
| 5,630,138 A | * | 5/1997 | Raman | ...................... | 717/162 |
| 5,634,114 A | * | 5/1997 | Shipley | .................... | 717/170 |
| 5,675,803 A | * | 10/1997 | Preisler et al. | ............. | 717/131 |
| 5,721,824 A | * | 2/1998 | Taylor | ........................ | 709/203 |
| 5,748,960 A | * | 5/1998 | Fischer | ...................... | 709/316 |
| 5,758,072 A | * | 5/1998 | Filepp et al. | ............... | 709/220 |
| 5,764,992 A | * | 6/1998 | Kullick et al. | .............. | 717/170 |
| 5,787,019 A | * | 7/1998 | Knight et al. | ............... | 709/324 |
| 5,805,899 A | * | 9/1998 | Evans et al. | ................ | 717/170 |
| 5,815,705 A | * | 9/1998 | Slivka et al. | .................. | 713/2 |
| 5,878,256 A | * | 3/1999 | Bealkowski et al. | ........... | 713/2 |
| 5,890,176 A | * | 3/1999 | Kish et al. | ................... | 707/511 |
| 5,919,247 A | * | 7/1999 | Van Hoff et al. | ........... | 709/217 |
| 6,112,025 A | * | 8/2000 | Mulchandani et al. | ...... | 709/331 |
| 6,112,253 A | * | 8/2000 | Gerard et al. | ............... | 709/315 |
| 6,112,304 A | * | 8/2000 | Clawson | ..................... | 713/156 |

* cited by examiner

*Primary Examiner*—Gregory Morse
*Assistant Examiner*—Hoang-Vu Antony Nguyen-Ba
(74) *Attorney, Agent, or Firm*—Martin & Associates, L.L.C.; Derek P. Martin

(57) ABSTRACT

A dependency checking apparatus and method allows checking the version of classes in an object-oriented program to assure the proper version is being used for each release of the software. According to a first preferred embodiment, classes themselves include static code that checks dependencies when the class is loaded. The first embodiment is simple to implement for classes. According to a second preferred embodiment, information relating to version checking is stored separate from the classes and is used to check dependencies. This second embodiment is more flexible, allowing the checking of interfaces as well as classes, and allows the dependency information to be altered without recompiling the classes being checked.

35 Claims, 5 Drawing Sheets

```
class B extends A implements I { static {
   VersionLoader.versionCheck("A",3)
}
.
.
.
(definition of class B)
}
```

```
class B extends A implements I { static {
    VersionLoader.versionCheck("A",3)
}
.
.
.
(definition of class B)
}
```

APPARATUS AND METHOD FOR CHECKING DEPENDENCIES AMONG CLASSES IN AN OBJECT-ORIENTED PROGRAM

BACKGROUND OF THE INVENTION

1. Technical Field

This invention generally relates to object-oriented programming and more specifically relates to an apparatus and method for checking for proper versions of classes in an object-oriented program.

2. Background Art

The development of the EDVAC computer system of 1948 is often cited as the beginning of the computer era. Since that time, computer systems have revolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object-oriented programming concepts. The goal of using object-oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object-oriented programming is the "class." A class is a template that defines a type of object. A class outlines or describes the characteristics or makeup of objects that belong to that class. By defining a class, objects can be created that belong to the class without having to rewrite the entire definition for each new object as it is created. This feature of object-oriented programming promotes the reusability of existing object definitions and promotes more efficient use of program code.

JAVA is the name of one very well-known and popular object-oriented computer programming language which is used to develop software applications. JAVA's popularity stems in part from its relative simplicity and the fact that JAVA is written in a manner that allows different computers (i.e., platforms) to execute the same JAVA code. In other words, JAVA is platform-independent. This feature has caused the use of JAVA to greatly increase with the growing popularity of the Internet, which allows many different type of computer platforms to intercommunicate.

Computer programs naturally evolve over time. The evolution of object-oriented computer programs entails defining new classes that have implementations different than previous versions. A new release of an existing program may use a combination of new classes and classes that were defined in a previous version. The processes and activities associated with modifying, updating, and tracking changes in a class over a period of time are known as "versioning." When one version of a first class requires a particular version of a second class, this is known as a "dependency", i.e., that the first class depends on the second class being of the correct version. For a computer program to run properly, it must check to assure that all the dependencies between classes are satisfied.

A specific example will illustrate the concepts of versioning and dependency checking. Assume that a company has been in business for many years and that the nature of the "employee" class that defines employee-related data changed as the information needs of the business developed. Beginning in 1970, the employee class included the name, address, phone number, date of hire, supervisor, and salary for each employee. In 1980 the definition of the employee class was changed to include information regarding 401K plans for the employee, and in 1990 the definition for the employee class was changed again to include information regarding each employee's performance and evaluation reviews. Thus, three different versions of the employee class exist over time.

A 1997 release of the software that includes the employee class will require the 1990 version of the employee class. In other words, one or more classes in the 1997 release of the software will depend on the 1990 version of the employee class being used. This is a dependency that must be enforced if proper program execution is to be assured. If the 1970 or 1980 version of the employee class is used for the 1997 release, improper information will result which will generate errors. For example, if the 1980 version of the class is used, and the 1997 release tries to access an employee's performance review, that information will not be present in the 1980 version of the employee class, so an employee object instantiated as a member of the 1980 employee class will not have data allocated to the performance review information and will not have methods to access that data. As a result, any attempt to access this data will return an error. There exists a need to check all classes to determine whether or not the proper versions of the different classes are being used.

Without a mechanism for checking the dependencies of various versions of classes in an object-oriented program, the computer industry will continue to suffer from inefficient methods of checking new versions of program code.

DISCLOSURE OF INVENTION

According to preferred embodiments of the present invention, a dependency checking apparatus and method allows checking the version of classes in an object-oriented program to assure the proper version is being used for each release of the software. According to a first preferred embodiment, classes themselves include static code that checks dependencies when the class is loaded. The first embodiment is simple to implement for classes. According to a second preferred embodiment, information relating to version checking is stored external to the classes and is used to check dependencies. This second embodiment is more flexible, allowing the checking of interfaces as well as classes, and allows the dependency information to be altered without recompiling the classes being checked.

BRIEF DESCRIPTION OF THE DRAWINGS

The preferred embodiments of the present invention will hereinafter be described in conjunction with the appended drawings, where like designations denote like elements, and.

BEST MODE FOR CARRYING OUT THE INVENTION

Figure 1:
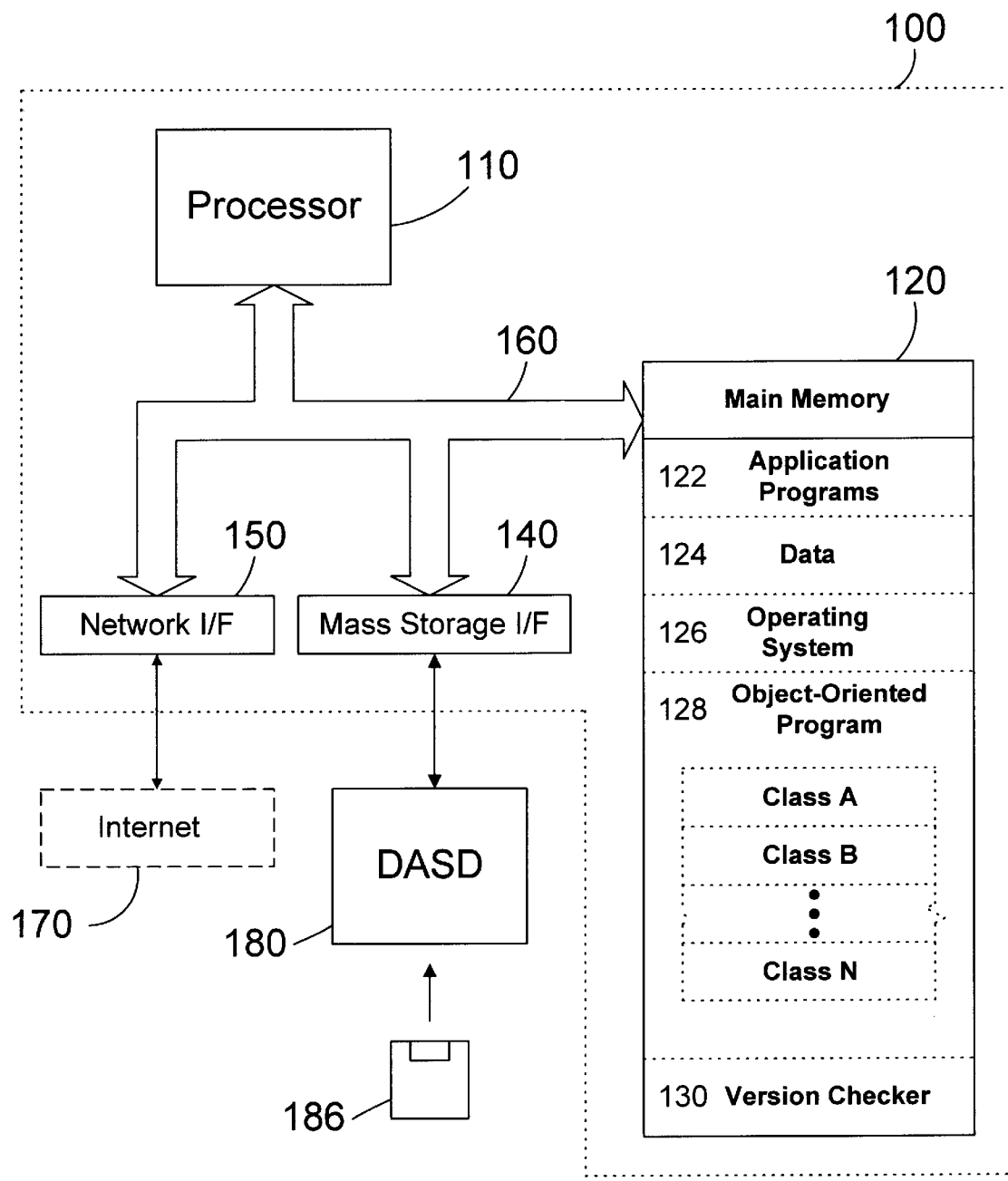
FIG. 1 is a block diagram of an apparatus according to a preferred embodiment of the present invention.

The present invention relates to object-oriented programming techniques. For those individuals who are not generally familiar with object-oriented programming, or the JAVA programming language in particular, the Overview section below presents many of the basic concepts and terminology that will help to understand the invention. Individuals skilled in the art of object-oriented programming may wish to skip this section and proceed directly to the Detailed Description section of this specification.

1. Overview

Object-oriented Technology v. Procedural Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process used to solve the problem; whereas the focus of object-oriented design is on casting the problem as a set of autonomous entities that can work together to provide a solution. The autonomous entities of object-oriented technology are, of course, objects. Object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object-oriented programming techniques. For example, Smalltalk, Object Pascal, C++ and JAVA are all examples of programming languages that support object-oriented programming to one degree or another.

JAVA Programming Language

JAVA is a modern object-oriented programming language designed by Sun Microsystems that has grown in popularity in recent years. JAVA offers many features and advantages that makes it a desirable programming language to use. First, JAVA is specifically designed to create small application programs, commonly called "applets," that can reside on the network in centralized servers, and which are delivered to the client machine only when needed. Second, JAVA is completely platform independent. A JAVA program can be written once and can then run on any type of platform that contains a JAVA Virtual Machine (JVM). The JVM model is supported by most computer vendors, thereby allowing a software vendor to have access to hardware and software systems produced by many different companies. Finally, JAVA is an object-oriented language, meaning that software written in JAVA can take advantage of the benefits of object-oriented programming techniques.

As in other object-oriented systems, operations in JAVA are performed by one object calling a method on another object. These objects can reside locally on the same machine or on separate JVM's physically located on separate computers or systems.

2. Detailed Description

According to a preferred embodiment of the present invention, an apparatus and method provide for automatically checking for proper versions of classes that have version dependencies on other classes. The checks are done automatically without requiring interaction with a user.

Referring to FIG. 1, a computer system 100 in accordance with the present invention includes a processor 110, a main memory 120, a mass storage interface 140, and a network interface 150, all connected by a system bus 160. Those skilled in the art will appreciate that this system encompasses all types of computer systems: personal computers, midrange computers, mainframes, etc. Note that many additions, modifications, and deletions can be made to this computer system 100 within the scope of the invention. Examples of possible additions include: a computer monitor, a keyboard, a cache memory, and peripheral devices such as printers.

Processor 110 can be constructed from one or more microprocessors and/or integrated circuits. Processor 110 executes program instructions stored in main memory 120. Main memory 120 stores programs and data that the computer may access. When computer system 100 starts up, processor 110 initially executes the program instructions that make up operating system 126. Operating system 126 is a sophisticated program that manages the resources of the computer system 100. Some of these resources are the processor 110, main memory 120, mass storage interface 140, network interface 150, and system bus 160.

Main memory 120 includes one or more application programs 122, data 124, operating system 126, an object-oriented program 128, and a version checker 130. Application programs 122 are executed by processor 110 under the control of operating system 126. Application programs 122 can be run with program data 124 as input. Application programs 122 can also output their results as program data 124 in main memory. In addition, main memory 120 includes object-oriented program 128 that has multiple classes defined (such as class A, class B . . . class N, as shown in FIG. 1). For the purposes of the discussion in this specification, we assume that object-oriented program 128 includes any and all possible configurations for a program and any interactions between objects. For example, program 128 may reside on a single computer system, or different classes or components may reside among different computers on a local area network, or different classes or components may be distributed over a large number of computers in a distributed object environment. The term "object-oriented program" as used herein is used in its broadest sense to include any interaction between any two objects. Version checker 130 performs checks on classes before interaction between instances of those classes are allowed.

Mass storage interface 140 allows computer system 100 to retrieve and store data from auxiliary storage devices such as magnetic disks (hard disks, diskettes) and optical disks (CD-ROM). These mass storage devices are commonly known as Direct Access Storage Devices (DASD), and act as a permanent store of information. One suitable type of DASD is a floppy disk drive 180 that reads data from and writes data to a floppy diskette 186. The information from the DASD can be in many forms. Common forms are application programs and program data. Data retrieved through mass storage interface 140 is usually placed in main memory 120 where processor 110 can process it.

While main memory 120 and DASD device 180 are typically separate storage devices, computer system 100 uses well known virtual addressing mechanisms that allow the programs of computer system 100 to behave as if they only have access to a large, single storage entity, instead of access to multiple, smaller storage entities (e.g., main memory 120 and DASD device 180). Therefore, while certain elements are shown to reside in main memory 120, those skilled in the art will recognize that these are not necessarily all completely contained in main memory 120 at the same time. It should be noted that the term "memory" is used herein to generically refer to the entire virtual memory of computer system 100. In addition, an apparatus in accordance with the present invention includes any possible configuration of hardware and software that contains the elements of the invention, whether the apparatus is a single computer system or is comprised of multiple computer systems operating in concert.

Network interface 150 allows computer system 100 to send and receive data to and from any network the computer system may be connected to. This network may be a local area network (LAN), a wide area network (WAN), or more specifically the Internet 170. Suitable methods of connecting to a network include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

System bus 160 allows data to be transferred among the various components of computer system 100. Although computer system 100 is shown to contain only a single main processor and a single system bus, those skilled in the art will appreciate that the present invention may be practiced using a computer system that has multiple processors and/or multiple buses. In addition, the interfaces that are used in the preferred embodiment may include separate, fully programmed microprocessors that are used to off-load compute-intensive processing from processor 110, or may include I/O adapters to perform similar functions.

At this point, it is important to note that while the present invention has been (and will continue to be) described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g. 186 of FIG. 1) and CD ROM, and transmission type media such as digital and analog communications links.

The remainder of this specification will describe how version checker 130 automatically checks the dependencies among classes in object-oriented program 128 before allowing program 128 to run. In a first embodiment, version checks and dependency information are placed within a class definition (such as in a static code block). In a second embodiment, version checks and the dependency information are stored external to the class definitions.

To understand the context of the present invention, one must first understand the concept of dependencies. A dependency is any relationship between classes that version checker 130 enforces before allowing object-oriented program 128 to run. One example of a particular type of dependency is a subclass. Because subclasses inherit all data and methods from all its parent classes, the version of the parent can determine the configuration of the subclass. We therefore introduce the concept of "pedigree" for classes.

Figures 2, 3:
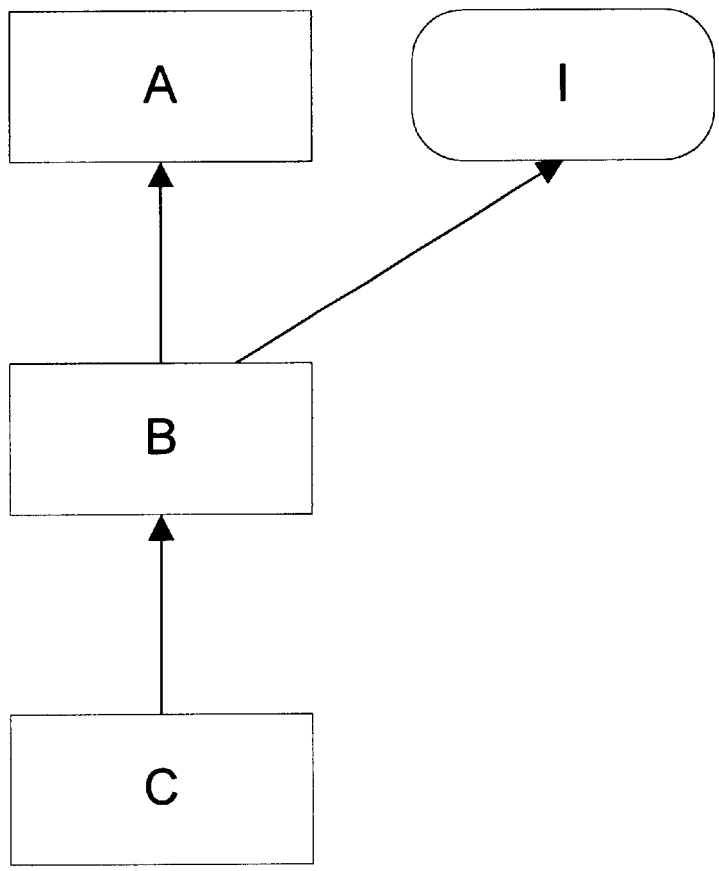
FIG. 2 is class diagram of a portion of a sample computer program.
FIG. 3 is a version table showing the valid dependencies that exist among different versions of classes and interfaces.

A class' pedigree is the versions of all ancestor classes, much like the pedigree for a thoroughbred racehorse can be traced back through its ancestors. Referring to FIG. 2, we assume that a class A is defined that has a subclass B, which, in turn, has a subclass C. Class B implements interface I. Assume that the definition of class A changes over time, producing versions A1, A2, and A3. Assume also that class B changes over time, producing versions B1, B2, and B3. Any B class is dependent on some version of class A, because B inherits methods and data from class A. Therefore, class B1 based on A1 is different than class B1 based on A2, which is different than class B1 based on A3. In this example, there are nine variations of class B, three versions of B for each of the three versions of A. In addition, if interface I changes over time to produce versions I1, I2 and I3, there will be a total of 27 possible variations of class B. If class C has versions C1, C2 and C3, then there are 81 possible variations of class C.

A "pedigree" for the discussion herein is defined by the version of the class, the version of every inherited ancestor class, and the version of every implemented ancestor interface. For the example above, while there are 81 theoretical variations of class C, in practical terms many of these combinations will not be valid. For example, if C was changed from C1 to C2 to account for changes made in going from I1 to I2, then any pedigree with (C2, I1) is invalid. If I2 is not upward compatible with I1, then any pedigree with (C1, I2) is also invalid. These types of incompatibilities between versions tend to narrow down the number of valid pedigrees.

Referring to FIG. 3, a pedigree may be represented on a table that has the classes and interfaces (i.e., entities) as the rows and the versions as the columns. An "X" in the table indicates that the version is part of the pedigree. The table of FIG. 3 illustrates a valid pedigree of (C1, B2, A3, I1). Note that the order of the items listed in the pedigree is somewhat arbitrary and could change according to specific needs, but we show one possible implementation that lists first the class to which the pedigree applies (class C), then lists the parents in order (class B then A) and finally lists any implemented interfaces (interface I). A pedigree table may represent a single pedigree, such as shown in FIG. 3, or may include multiple pedigrees. For example, if both A2 and A3 were compatible with B2, C2 and I1, both the A2 and A3 boxes could be checked on the same pedigree table. Of course, these two pedigrees could also be represented on separate pedigree tables as well.

The pedigree of a class is one specific type of dependency that may exist between classes. If the classes that are present do not represent a valid pedigree, the object-oriented program is not correct and will not be allowed to execute. Other types of dependencies among classes may be important as well. For example, the version of an employee class may depend on the version of the department class that contains the employee. A class that has any relationship with another class may desire to check the version of the other class. In fact, once version checker 130 is in place, a class may check the version of any other class in the object-oriented program 128.

Version checker 130 thus has the capability to check any dependency between any two classes. This power allows version checker 130 to check the version of any class in the system. For example, version checker 130 could check the version of operating system 126; could check the version of a database; or could check the version of a time stamp to see if a demo copy of a program has expired. Many other variations are possible. Whatever the dependency between versions of two or more classes, version checker 130 can perform version checks to determine that the versions of the classes are compatible.

Figure 4:
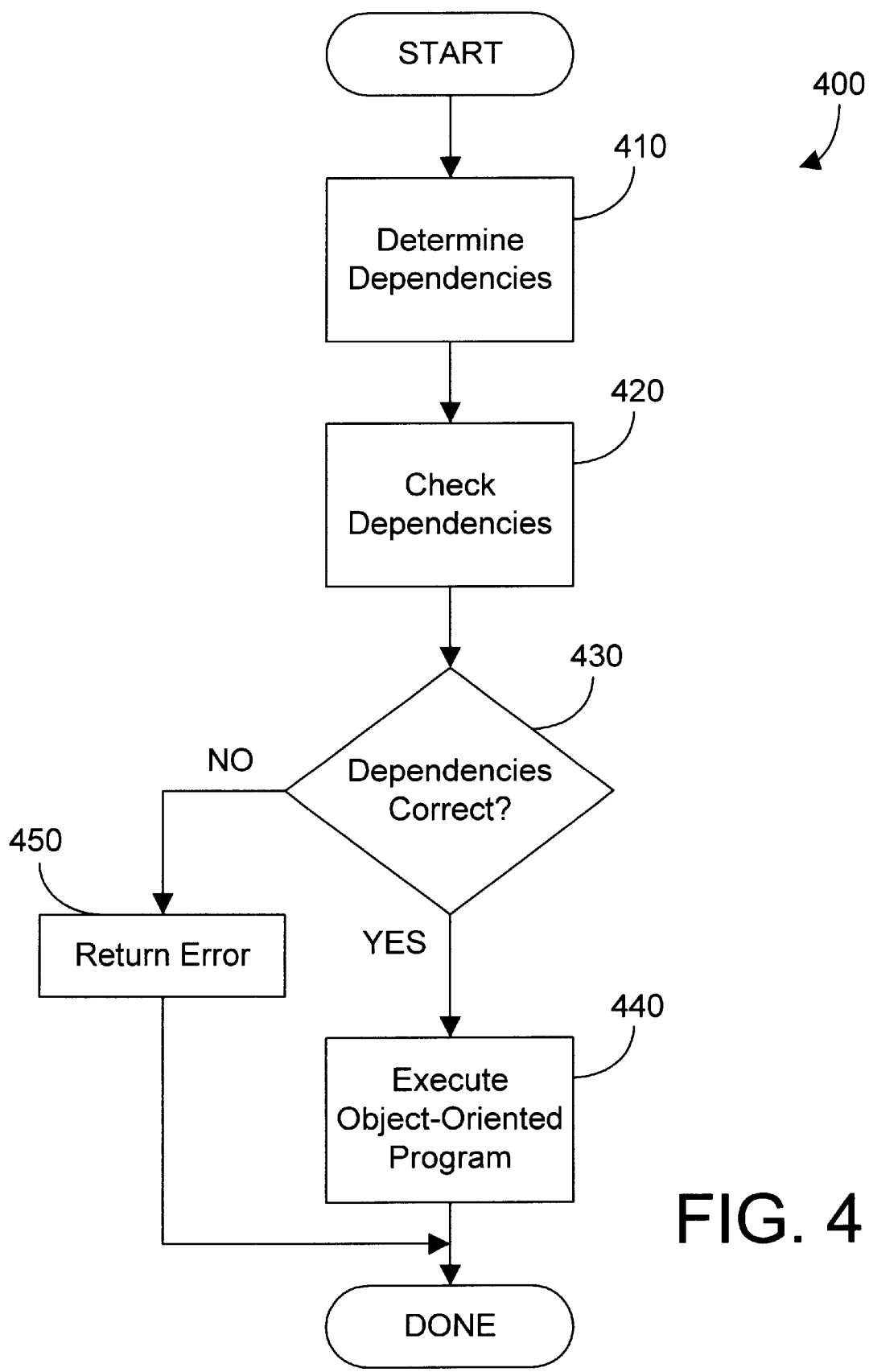
FIG. 4 is a flow diagram of a method in accordance with a preferred embodiment.

Referring now to FIG. 4, a method 400 in accordance with the preferred embodiment begins by determining the dependencies among classes (step 410). Once the dependencies have been determined, they are checked (step 420). If all of the dependencies are correct (step 430=YES), the object-oriented program may be executed (step 440). In the alternative, if one or more dependency is not satisfied (step 430=NO), method 400 returns an error (step 450), which causes the object-oriented program to not be run. For method 400 as illustrated in FIG. 4, version checker 130 of FIG. 1 performs steps 410, 420, 430, and 450, while step 440 is performed if version checker 130 does not return an error.

Two specific embodiments for accomplishing method 400 are disclosed herein. The first embodiment uses information within the class definition to perform version checking. The second embodiment uses information external to the class to perform version checking. We assume for the discussion below that object-oriented program 128 is written in JAVA for the purpose of illustration. Of course, other suitable object-oriented or object-based languages could be used.

Figures 5, 6:
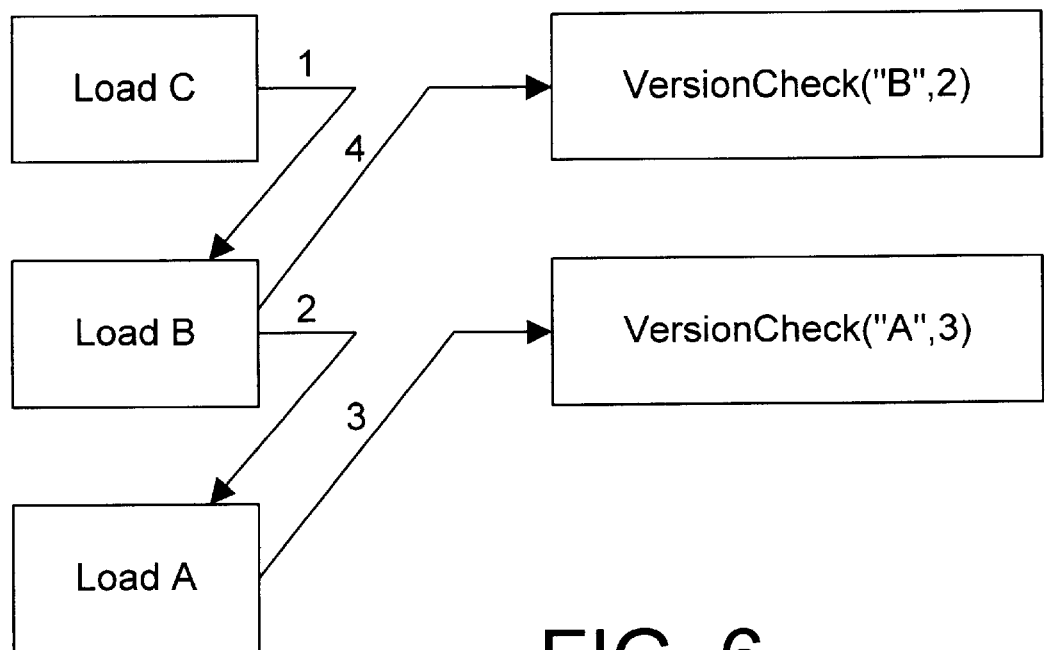
FIG. 5 is a sample of JAVA code showing the implementation of a version checker in static code of a class definition in accordance with the first embodiment.
FIG. 6 is a flow diagram of a method in accordance with a preferred embodiment.

According to the first embodiment, information in the class definition itself is used to check for the proper versions. For a JAVA implementation, this information would be included in the ".class" file. For example; FIG. 5 shows a portion of a class definition for class B in FIG. 2. A ".class" file in JAVA may include a static code block that is executed only once when the class is loaded. The static code for the specific example of FIG. 5 checks to make sure that class version A3 is the ancestor class that is used. Note that, in this implementation, the method versionCheck( ) is a method on a special class loader object named VersionLoader, which is an instance of a java.lang.ClassLoader class, which is defined in JAVA to load class files. The operation of the versionCheck( ) method on the VersionLoader object may best be understood with reference to FIGS. 2, 3 and 6.

For the specific example of classes in FIG. 2 and for the pedigree of FIG. 3, a sample flow is shown in FIG. 6. When class C is first loaded by the VersionLoader object, it recognizes that class C is a subclass of class B, so it loads class B (step 1). It also recognizes that class B is a subclass of class A, so it loads class A as well (step 2). Assuming that A is the highest ancestor for C, the VersionLoader object then executes the static code block for A (if present), which we assume for convenience does not perform any version checks. Next, the static code for class B is executed (as shown in FIG. 5), which calls versionCheck( ) to make sure that class A is version 3 (step 3). Finally, the static code for class C is executed, which calls versionCheck( ) to make sure that class B is version 2 (step 4). Assuming that these classes are the proper versions, the calls to versionCheck( ) do not return an error, and object-oriented program 128 may then be executed. If either class B or class A are not the right version, the versionCheck( ) method for that class will return an error, and the object-oriented program will not be allowed to execute. The preferred method of returning an error is to throw an exception, but any manner for alerting the system that an improper version is present may be used in the present invention.

Note that versionCheck( ) as described above and shown in FIGS. 5 and 6 has two arguments, a class name and a version number. However, it is equally within the scope of the preferred embodiments to specify a class name and multiple version numbers that may be compatible. Furthermore, in some systems each version of a class must have a unique name, so instead of specifying a class name and one or more version numbers, one or more unique class names will be specified as parameters to the versionCheck( ) method. Regardless of the specific parameters or format used, versionCheck( ) is called with sufficient information to determine if a particular class is an appropriate version.

Embedding the version checking into the class definition has some advantages. First, the static code block is only-executed once when the class is loaded. Thus, the performance penalty for performing the version checking is minimal. In addition, it is very simple to add one or more statements to the static code block to perform the required version checks. A class need only check its parent, because the parent will check its parent when it is loaded, and so on up the chain of ancestors. One of the disadvantages is that an interface in JAVA does not have static code, so interfaces must be handled in a different way than classes. One possibility is to add an additional call to versionCheck("I", 1) in the static code for class B to assure that interface I is version 1. In this manner, a class need only perform a version check on its parent class and all interfaces it implements. Another disadvantage of placing the version checking in the class definitions is that any change to the version checking will require the affected classes to be recompiled.

Figure 7:
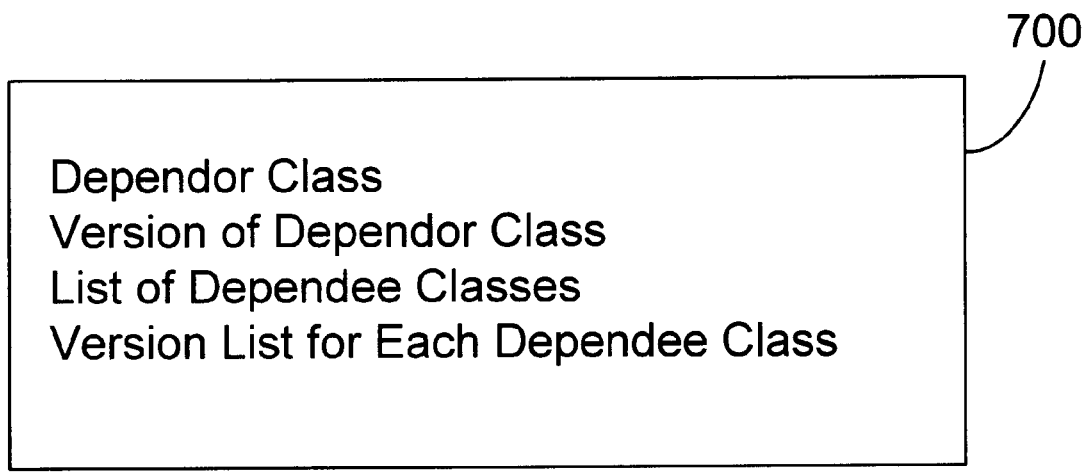
FIG. 7 if a diagram showing information stored in an external file in accordance with the second embodiment.

The second embodiment provides more flexibility in checking dependencies among classes by storing dependency information external to the class definitions. For example, a file may be used to store dependency information. Referring to FIG. 7, a file 700 that contains dependency information specifies the dependor class, the version of the dependor class, a list of dependee classes, and a list of valid versions for each dependee class. For the discussion herein, a dependor class is a class that depends on another class being a particular version, while a dependee class is a class that another class is checking to see if the dependee class is the proper version. There may be multiple dependencies specified by including multiple dependencies in the list of dependee classes. The version list for each dependee class lists the valid version(s) for each dependee class. This information in the file may be used by the versionCheck( ) method to determine whether a dependee class is of the proper type for a particular dependor class. There may be a separate file for each dependor class, or the dependency information for multiple dependor classes may be stored in a single file.

File 700 may be located on the same computer system as version checker 130 (e.g., on DASD 180 of FIG. 1), or it may be located elsewhere. Regardless of the physical location and means for accessing the information in the file, the present invention assumes that the dependency information in file 700 may be accessed to perform the dependency checks prior to executing object-oriented program 128.

One skilled in the art will also realize that the information in file 700 may also be contained within a separate program that is invoked to perform the dependency checking. One suitable program would be a method on an object that contains data corresponding to file 700. In this scenario, the versionCheck( ) method would delegate its function to a method on the object that contains the dependency information. Another suitable program would be any other program that could either contain the dependency information, or could access the dependency information outside the program.

Furthermore, any external source for dependency information is expressly encompassed within the scope of the present invention. For example, the dependency information could be stored in an HTML file. In addition, the dependency information could be retrieved from a socket on the world-wide web. We see from these powerful variations that dependency information could reside on a central database. When a program loads a class, it could check a database (such as a web site) for the dependency information, and determine whether the current configuration of the program is a valid configuration.

By placing the dependency information in a separate file, version checker 130 is much more flexible than when the dependency information is embedded into the ".class" file. For one thing, the dependency information is stored and processed in the same way for classes and interfaces. In addition, placing the dependency information in a separate file or program allows the dependency information to be updated without recompiling the object-oriented program 128. This advantage is very significant in light of the fact that many classes have ancestor classes and/or interfaces that are defined by different groups or different companies, possibly as class libraries or frameworks. A program that uses classes defined by other entities will not be able to recompile these entities when version information changes. The disadvantage is that the file(s) or program(s) that contain the dependency information must either be supplied with the ".class" files, or must be accessed and maintained in a central database. Any changes to any versions in the object-oriented program will require corresponding changes in the external dependency information.

The two preferred embodiments disclosed herein provide different ways to determine and check dependencies among classes in an object-oriented system to assure the classes are of the proper version before successfully loading these classes. If one or more class is not the right version, the object-oriented program is not allowed to run.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, if the version check fails, instead of inhibiting the running of the object-oriented program, the version checker could display a warning message to the user and attempt to run the program. If one or more errors occur, the user would then know to suspect version problems as one possible source of the error. This and other modifications are within the scope of the present invention.

What is claimed is:

1. An apparatus comprising:

at least one processor;

a memory coupled to the at least one processor;

an object-oriented program residing in the memory and executed by the at least one processor, the object-oriented program including a plurality of classes;

a version checker residing in the memory and executed by the at least one processor, the version checker checking at least one dependency between at least two of the plurality of classes;

wherein a definition for at least one of the plurality of classes includes static code that is executed once when the at least one class is loaded and that is not included in any instance of the at least one class, the static code including a call to the version checker.

2. The apparatus of claim 1 further comprising information stored external to the plurality of classes that determines the at least one dependency checked by the version checker.

3. The apparatus of claim 1 wherein the version checker comprises a program for performing checking of the at least one dependency.

4. The apparatus of claim 1 wherein the version checker comprises a method on one of the plurality of classes, the method being defined to perform the checking of the at least one dependency.

5. The apparatus of claim 1 wherein the at least one dependency comprises dependency information.

6. The apparatus of claim 5 wherein the dependency information includes:
a name and a version of a dependor class;
a list of dependee classes to check for proper versions; and
a version list for each class in the list of dependee classes.

7. The apparatus of claim 5 wherein the dependency information determines if a version of a first of the plurality of classes is compatible with a version of a second of the plurality of classes.

8. The apparatus of claim 5 wherein the dependency information resides within at least one definition of at least one of the plurality of classes.

9. The apparatus of claim 5 wherein the dependency information resides external to the plurality of classes.

10. The apparatus of claim 9 wherein the dependency information resides in at least one file.

11. The apparatus of claim 9 wherein the dependency information resides on a computer system coupled to the world-wide web, and wherein the dependency information is accessed via a socket on the world-wide web.

12. The apparatus of claim 9 wherein the dependency information resides within a program that includes the version checker.

13. A method for checking at least one dependency among a plurality of classes in an object-oriented program, the object-oriented program including run-time code the method comprising the steps of:
(A) loading a first class that is one of the plurality of classes, the first class including static code that calls a version checker to check dependencies between the first class and a second class in the object oriented program;
(B) determining at least one dependency between the first class and at least one of the plurality of classes by executing the static code only when the first class is loaded;
(C) the execution of the static code automatically checking the at least one dependency determined in step (B) before executing the run-time code in the object-oriented program, wherein the run-time code does not execute the static code.

14. The method of claim 13 further comprising the step of inhibiting the execution of the object-oriented program if the step of checking the at least one dependency returns a result indicating that the at least one dependency is not satisfied.

15. The method of claim 13 wherein the loading of the one class causes the execution of a static code block containing an instruction that performs steps (A) and (B).

16. The method of claim 13 wherein the step of automatically checking the at least one dependency comprises the step of executing a program that is external to the plurality of classes.

17. The method of claim 13 wherein the step of automatically checking the at least one dependency comprises the step of calling a method defined in the plurality of classes.

18. The method of claim 13 wherein the step of determining the at least one dependency between the plurality of classes comprises the step of reading dependency information that resides external to the plurality of classes.

19. The method of claim 18 wherein the dependency information includes:
a name and a version of a dependor class;
a list of dependee classes to check for proper versions; and
a version list for each class in the list of dependee classes.

20. The method of claim 18 wherein the step of reading dependency information that resides external to the plurality of classes comprises reading a file that contains the dependency information.

21. The method of claim 18 wherein the step of reading dependency information that resides external to the plurality of classes comprises reading from a socket on the woldwide web.

22. A program product comprising:
a version checker that checks at least one dependency between at least two of a plurality of classes in an object-oriented program that includes run-time code, wherein a definition for at least one of the plurality of classes includes static code that is executed only when the at least one class is loaded and before the run-time code is executed, and that is not executed by the run-time code, the static code including a call the version checker; and
signal bearing media bearing the version checker.

23. The program product of claim 22 wherein the signal bearing media comprises recordable media.

24. The program product of claim 22 wherein the signal bearing media comprises transmission media.

25. The program product of claim 22 further comprising information stored external to the plurality of classes that determines the at least one dependency checked by the version checker.

26. The program product of claim 22 wherein the version checker comprises a program for performing checking of the at least one dependency.

27. The program product of claim 22 wherein the version checker comprises a method on one of the plurality of classes, the method being defined to perform the checking of the at least one dependency.

28. The program product of claim 22 wherein the at least one dependency comprises dependency information.

29. The program product of claim 28 wherein the dependency information includes:
a name and a version of a dependor class;
a list of dependee classes to check for proper versions; and
a version list for each class in the list of dependee classes.

30. The program product of claim 28 wherein the dependency information determines if a version of a first of the plurality of classes is compatible with a version of a second of the plurality of classes.

31. The program product of claim 28 wherein the dependency information resides within at least one definition of at least one of the plurality of classes.

32. The program product of claim 28 wherein the dependency information resides external to the plurality of classes.

33. The program product of claim 32 wherein the dependency information resides in at least one file.

34. The program product of claim 32 wherein the dependency information resides on a computer system coupled to the world-wide web, and wherein the dependency information is accessed via a socket on the world-wide web.

35. The program product of claim 32 wherein the dependency information resides within a program that includes the version checker.

* * * * *

UNITED STATES PATENT AND TRADEMARK OFFICE
CERTIFICATE OF CORRECTION

PATENT NO.     : 6,442,753 B1                                    Page 1 of 1
DATED          : August 27, 2002
INVENTOR(S)    : Scott Neal Gerard et al.

It is certified that error appears in the above-identified patent and that said Letters Patent is hereby corrected as shown below:

Column 10,
Line 52, "classes;" should be -- classes, the object oriented program including run-time code; --
Line 59, "is loaded and that is not included in any instance of the at least one class," should be -- is loaded and before the run-time code is executed, and that is not executed by the run-time code, --

Column 12,
Line 21, "including a call the" should be -- including a call to the --.

Signed and Sealed this

Twenty-fifth Day of March, 2003

JAMES E. ROGAN
*Director of the United States Patent and Trademark Office*